United States Patent [19]

Salyer

[11] Patent Number: 5,565,132
[45] Date of Patent: Oct. 15, 1996

[54] THERMOPLASTIC, MOLDABLE, NON-EXUDING PHASE CHANGE MATERIALS

[75] Inventor: Ival O. Salyer, Dayton, Ohio

[73] Assignee: The University of Dayton, Dayton, Ohio

[21] Appl. No.: 468,441

[22] Filed: Jun. 6, 1995

[51] Int. Cl.⁶ .............................. C09K 3/18; F28D 17/00
[52] U.S. Cl. ................. 252/70; 165/10; 165/53; 524/489; 524/490; 524/493
[58] Field of Search ............................ 524/493, 489, 524/490; 525/222, 224, 229; 523/216, 206, 137, 300; 252/70; 165/10, 53

[56] References Cited

U.S. PATENT DOCUMENTS

| | | | |
|---|---|---|---|
| 4,111,189 | 9/1978 | Dizon | 252/73 |
| 4,259,401 | 3/1981 | Chahroudi et al. | |
| 4,797,160 | 1/1989 | Salyer. | |
| 4,825,939 | 5/1989 | Salyer et al. | 252/70 |
| 5,053,444 | 10/1991 | Trotoir | 524/493 |
| 5,053,446 | 10/1991 | Salyer. | |
| 5,106,520 | 4/1992 | Salyer. | |
| 5,282,994 | 2/1994 | Salyer. | |

FOREIGN PATENT DOCUMENTS

| | | |
|---|---|---|
| 481564 | 4/1992 | European Pat. Off. |
| 5-59352 | 3/1993 | Japan. |
| 6-65446 | 3/1994 | Japan. |
| 6-192646 | 7/1994 | Japan. |
| 7-48561 | 2/1995 | Japan. |

*Primary Examiner*—Veronica P. Hoke
*Attorney, Agent, or Firm*—Killworth, Gottman, Hagan & Schaeff

[57] ABSTRACT

A thermoplastic, moldable, non-exuding phase change material in the form of a composite useful for thermal energy storage. The composite is preferably a solidified melt mixture of a polyolefin resin, and ethylene copolymer, silica particles and a fatty acid, fatty acid ester, primary alcohol or hydrocarbon phase change material. For a microwave heating capability, a microwave absorbing additive may be added as a fifth major ingredient. The composite can be formed into a variety of configurations such as pellets, sheets, rods, tubes, plugs for hollow core cement blocks, films, and fibers, all for thermal energy storage uses.

20 Claims, No Drawings

THERMOPLASTIC, MOLDABLE, NON-EXUDING PHASE CHANGE MATERIALS

BACKGROUND OF THE INVENTION

The present invention relates to thermoplastic, moldable, non-exuding phase change materials and method of making same.

Phase change materials may be repeatedly converted between solid and liquid phases and utilize their latent heat of fusion to absorb, store and release heat or cool during such phase conversions.

These latent heats of fusion are greater than the sensible heat capacities of the materials. For example, in phase change materials, the amount of energy absorbed upon melting or released upon freezing is much greater than the amount of energy absorbed or released upon increasing or decreasing the temperature of the material over an increment of 10° C.

Upon melting and freezing, per unit weight, a phase change material absorbs and releases substantially more energy than a sensible heat storage material that is heated or cooled over the same temperature range. In contrast to a sensible heat storage material that absorbs and releases energy essentially uniformly over a broad temperature range, a phase change material absorbs and releases a large quantity of energy in the vicinity of its melting/freezing point.

The problem with such phase change materials is in containing them in an appropriate matrix. In my U.S. Pat. No. 5,053,446, there is disclosed a polyolefin matrix containment system; in my U.S. Pat. No. 4,797,160, there is disclosed use of a cementitious matrix containing alkyl hydrocarbon phase change materials neat or in pellets or granules formed by incorporating the alkyl hydrocarbon phase change material in polymers or rubbers, and in my U.S. Pat. No. 5,106,520 and 5,282,994, there is disclosed a free flowing, conformable powder-like mix of silica particles and a phase change material.

Each of these containment means have properties and utilities for specific applications, but none is universally best for all applications. For example, pellets of a phase change material, such as a crystalline alkyl hydrocarbon, and a polyolefin, such as cross-linked high density polyethylene (HDPE), have been used in floor panels and elsewhere for moderating room temperatures and for energy efficiency. But, such pellets are expensive and have a problem with some "oozing" (exuding) of the low melting point phase change material during thermocycling of the pellets above and below the melting temperature of the phase change material.

Accordingly, it would be desirable to have ways to contain alkyl hydrocarbon phase change materials that might be lower in cost and eliminate oozing and/or provide properties that would enable the phase change material to be more effectively utilized.

SUMMARY OF THE INVENTION

That need is met by the present invention which provides a multi-component composite that is potentially low in cost, can be formed into a variety of configurations (pellets, sheets, rods, tubes, plugs for hollow core cement blocks, films and fibers), shows no oozing of the phase change material when thermocycled, has an apparent density of about 1, and can be modified with an additional component to provide microwave heating capability. In addition, the thermoplastic, moldable, non-exuding phase change material of the present invention, after formed into pellets, for example, can be repeatedly thermocycled above the melting point of the phase change material without undergoing melt flow, and there is little apparent change in volume during melting and freezing.

The composite of the present invention is a solidified melt mixture of an alkyl hydrocarbon phase change material, a polyolefin resin, an ethylene copolymer, and silica particles. When a microwave heating capability is desired, a microwave absorbing additive can be added as a fifth major ingredient.

The polyolefin resin is preferably an uncrosslinked high density polyethylene; although, a higher melting polypropylene may also be used. The ethylene copolymer is preferably an ethylene-vinyl acetate copolymer containing approximately 10–20% by weight vinyl acetate, but may also be an ethylene-methyl acrylate copolymer, an ethylene-ethyl acrylate copolymer, or equivalent molar copolymer. The silica particles are preferably precipitated silica particles having a surface area of from 50 to 500 square meters per gram and primary particle sizes of from 0.005 to 0.025 microns; although, fumed silicas can also be used. The alkyl hydrocarbon phase change material is preferably a crystalline alkyl hydrocarbon having a heat of fusion of greater than about 30 cal/g. When the composite is to be used for thermal energy storage in building structures, a paraffin having a C-18 or C-19 chain length and a melting and freezing point of about 75° F. and thermal energy storage of about 30 cal/g is preferred. When the composite is to be used for thermal energy storage in food and beverage containers, such as by placing the composite, molded and shaped to fit into the space between the walls of a dual walled food or beverage container, such as cups, bowls, plates, trays, etc., a paraffin having a melting and freezing point of about 147° F. is preferred. The microwave absorbing additive is preferably a glycerine or a carbon black.

In one embodiment, the preferred weight percentage of each ingredient based on the total weight of the composite is about 60% phase change material, about 16–22% polyolefin, about 8–12% ethylene copolymer, and about 8–16% silica particles. A small amount, i.e. 0.1 to 8.0% of carbon black may be added to render the composite microwaveable. In the microwaveable embodiment when glycerine is used as the microwave absorbing additive, the preferred weight percentages are about 55% phase change material, about 15–21% polyolefin, about 7–11% ethylene copolymer, about 7–15% silica particles, and about 7.5% microwave absorbing additive.

The method of preparing the composite involves melting an alkyl hydrocarbon phase change material, stirring silica particles into that melted material until a stiff gel is formed, to the stiff gel a mixture of polyolefin resin and ethylene copolymer, heating to melt the polyolefin resin and ethylene copolymer, mixing vigorously to form a uniform viscous gel, cooling the viscous gel to solidify it into a moldable composite, and forming the moldable composite into a shape useful for thermal energy storage. When a microwaveable composite is desired, the microwave absorbing additive is added either early into the melted phase change material or last after the other four ingredients have already been incorporated, but in any event, prior to the cooling step.

As mentioned previously, the composite can be formed into a variety of shapes. For example, it can be formed into pellets which can be used in all of the manners in which the pellets of U.S. Pat. No. 5,053,446 are used. It can also be molded into a plug form sized to fit into the hollow core(s) of a hollow core cementitious building block as disclosed in my pending application Ser. No. 08/468,441, filed on an even date herewith. Likewise the composite of the present invention can be molded and shaped to fit into the space between the walls of a dual walled food or beverage container, such as cups, bowls, plates, trays, etc. Numerous other forms and thermal energy storage uses are possible.

The composite of the present invention has the advantage of lower cost, thermoplastic processability, adaptability for forming into pellets, sheets, rods, films, fibers and moldings, and higher apparent density (when compared with phase change material/silica dry powders), and microwave heating capability and elimination of oozing (when compared with phase change material/cross-linked HDPE pellets). This combination of properties and performance characteristics makes the phase change material of the present invention suitable for a wide variety of applications for which previous phase change materials have not been universally adapted.

Accordingly, it is an object of the present invention to provide an improved phase change material in the form of a composite which is thermoplastic, moldable, and non-exuding and to provide a method for making such a composite. These, and other objects and advantages of the present invention, will become apparent from the following detailed description and the accompanying claims.

DETAILED DESCRIPTION OF THE PREFERRED EMBODIMENT

The composite of the present invention, in its most basic form is a solidified melt mixture of a polyolefin resin, an ethylene copolymer, silica particles, and an alkyl hydrocarbon phase change material. When it is desired to have a composite that can be heated by microwave energy, then a fifth major ingredient, namely, a microwave absorbing additive is added.

The polyolefin is preferably a high-density polyethylene (HDPE) having a molecular weight or melt index in the range of 0.5 to 5 decigrams/minute. Examples of such materials are Marlex 6006 and Alathon 6210 from Phillips Chemical Co., Bartlesville, Okla. and Occidental Chemical Company, Niagara Falls, NY, respectively. The HDPE when it cools from the melt establishes a matrix within which the lower melting phase change material can melt and freeze without changing the volume of the composite significantly. Thus, the melting temperature must be well above the highest temperature that will be encountered in use. For this reason, commercial low-density polyethylenes would be less desirable though not without some utility. It also is possible to substitute a higher melting polypropylene for HDPE, which may be a decided advantage in some applications, although, processing is more difficult.

The ethylene copolymer serves a compatibilizing bridge between the very low molecular weight phase change material and the high molecular weight, high melting HDPE. A series of ethylene-vinyl acetate (EVA) copolymers containing from 5 to 28% wt. of vinyl acetate were tested for compatibility and oozing reduction. As a result, copolymers in the range of 10–20% wt. of vinyl acetate are preferred and those containing about 15–17% wt. acetate most preferred. Comparable compatibility and non-oozing could be obtained in melt-mixed blends wherein equivalent quantities of ethylene/methyl acrylate (EMA), or ethylene/ethyl acrylate (EEMA) are substituted for EVA.

The silica in the composite is added to tie up the low-melting phase change material in a stable gel—thereby to prevent oozing. The amount of silica is, therefore, directly related to the amount of the phase change material and should be about 7–16% of composite weight. Preferred is ABS precipitated silica from PPG Industries Inc., of Pittsburgh, Pa., which is a normal, hydrophilic silica with a surface area of 150 $m^2$/gram and a particle size of about 0.022 microns. However, other precipitated silica having a comparable particle size and surface area would work equally as well. Fumed silicas of comparable or smaller particle size and equal or greater surface should also be satisfactory, but are much more expensive. Accordingly, the preferred silica is a precipitated hydrophilic silica having a particle size of 0.005 to 0.025 microns and a surface area of 50 to 500 square meters per gram.

Substantially any phase change material can be used which is compatible with the polyolefin. In most cases, compatible phase change materials will be characterized by a long alkyl hydrocarbon chain within their molecular structure. Preferred phase change materials are crystalline organic compounds such as crystalline alkyl hydrocarbons, crystalline fatty acids, crystalline fatty acid esters, crystalline 1-olefins, crystalline primary alcohols, crystalline alicyclic hydrocarbons, and crystalline aromatic hydrocarbons which melt and freeze within the desired thermal transfer temperature range (e.g., 0° to 80° C.).

A number of commercially available waxes are useful as phase change materials in the present invention including Shellwax 100 (MP 42°–44° C.), Shellwax 120 (MP 44°–47° C.), Shellwax 200 (MP 52°–55° C.), Shellwax 300 (MP 60°–65° C.) all of which are products of Shell Oil Co., Houston, Tex.; Boron R-152 (MP 65° C.) a product of BP America, Cleveland, Ohio; Union SR-143 (MP about 61° C.) a product of Union Oil Co., Los Angeles, Calif.; Witco 128 (MP about 53° C.), Witco LLN, Witco 45A, Witco K-18, Witco K-19, Witco K-61, Witco K-51, and Witco 85010-1 all products of Witco Corp., New York, N.Y.; Aristowax 143 (MP 34°–61° C.) from Unocal Corp., Los Angeles, Calif., and Paraffin 150 (MP about 61° C.). These waxes have heats of fusion greater than 30 cal/g and by comparison to other phase change materials, they are inexpensive. Many of them cost as little as $.15 (U.S.) per pound when purchased in a tank car quantity.

The phase change material is selected to have a melting temperature in the range desired for the intended application. For heating and cooling of residential buildings, a paraffin of about C-18 or C-19 chain length (e.g., K-18 or K-19 from Witco) that melts and freezes near room temperature (~75° F.) would be selected. For food serving and other higher temperature uses, a phase change material that melts in the region of 147° F. (e.g., Parvan 147 from Exxon) would be selected.

In prior research, glycerine at about 10% wt. has been found to be an effective microwave absorbing additive in phase change material/silica dry powders for hot medical therapy and warm clothing applications. In the current melt-mixed composite, a somewhat lower concentration in the amount of about 7–8% wt. appears to heat effectively in about 4 minutes to a temperature well above the melting point of the phase change material component.

A somewhat more effective alternate to the glycerine as a microwave heating additive is the special grade of Cabot Conducting Carbon Black XC-72-R from Cabot Corp., Boston, Mass. This black will heat effectively at lower concentrations than glycerine. A further advantage of the carbon black as a microwave heating additive is that since it is not a liquid that has to be taken up by the silica (gelled), a formulation with somewhat higher concentration of phase change material could be used. The major disadvantage of carbon black is that even in low concentrations the color of the composite will be changed to a dark gray to black depending on the exact concentration.

Thus, when the composite is without a microwave absorbing additive or when carbon black is used as that additive in small amounts (i.e., about 0.1–8 weight percent), then the composite will preferably contain about 60% phase change material, about 16–22% polyolefin, about 8–12% ethylene copolymer and about 8–16% silica particles, all based on the total weight of the composite. When glycerine is added as a microwave absorbing additive, the preferred percentages are about 55% phase change material, about 15–21% polyolefin, about 7–11% ethylene copolymer, about 7–15% silica particles, and about 7–8% microwave absorbing additive.

EXAMPLE 1

Illustrative Example of Laboratory Manufacture of K-18/HDPE/E-VA/Silica (60/16/8/16) Composite 1. Obtain supplies of Witco K-18 phase change material from Witco Corp., Santowhite Powder antioxidant from Monsanto Chemical, Co., HDPE (Marlex 6006 or Alathon 6210 from Phillips Chemical Co. and Occidental Chemical Co., respectively), EVA Copolymer (17% VA copolymer) from Quantum Chemical Co. and Silica (ABS) from PPG Industries Inc.
2. Select a small 60 gram batch size of K-18 for ease of manual mixing. Weigh this amount of K-18 into a small stainless steel mixing bowl of proper size, add 1 part of Santowhite Powder antioxidant (based on the K-18)., and heat to 150° C. with stirring.
3. Incrementally, add with stirring 16 grams of ABS silica to form a rather stiff gel.
4. To the gel, add together 16 grams of Alathon 6210 and 8 grams of EVA. Heat to melt the two polymers, then mix vigorously with a putty knife or spatula to a uniform viscous gel with no visible lumps of HDPE or EVA pellets.
5. Pour or trowel the viscous gel in a flat 12"×12" polished steel mold, place a polished metal sheet on top of the melt, and press manually to form a flattened disc of about ⅛" thickness.
6. While the disc is still hot, remove the top cover plate and use a sharp knife to slice the molded disc into pellets. The pellets may be used "as is," extruded to form strands, fibers, films, etc., or molded into shapes. EXAMPLE 2.

Illustrative Example of Laboratory Manufacture of PCM/HDPE/E- VA/Silica/Glycerine (55/16/8/14/7) Composite with Microwave Heating Capability 1. The raw materials are the same as in the above example, except that a higher melting phase change material (e.g., Parvan 147 from Exxon) is substituted for K-18, and there is an added microwave heating component (Glycerine or Carbon Black).
2. The other steps in the laboratory process are identical to the above example except for the added microwave heating component. If glycerine is used, it may be added early into the PCM component or added last after the other four components have already been incorporated.
3. The mixed melt can be pressed to form a sheet disc or processed into pellets, sheets, films, fibers, or molded objects.
4. As previously noted, if carbon black is used as the microwave absorbing additive, the amount of phase change material can be increased to ~60% wt.

EXAMPLE 3

Composites No. 1–8, were prepared as set forth in Table I below, with the physical evaluation made, as also noted in Table I:

TABLE I

| NO. | COMPOSITE | PERCENT VA | SURFACE OIL RATING | COMMENT |
|---|---|---|---|---|
| 1 | K-18/Marlex 6006/E-VA/ABS 65/25/10/5 |  | 3 | strong, very brittle, very little oil |
| 2 | K-18/Marlex 6006/E-VA/ABS 65/20/10/5 | 19 | 4 | oil on squeezing, brittle but strong |
| 3 | K-18/Marlex 6006/E-VA/ABS 65/20/10/5 | 28 | 3 | brittle, not too strong, very little oil |
| 4 | K-18/Alathon 6210/E-VA/ABS 60/21.5/10.5/8 | 17 | 2 | strong, tough, almost no oil |
| 5 | K-18/Alathon 6210/E-VA/ABS 60/20/10/10 | 17 | 2 | strong, tough, almost no oil |
| 6 | K-18/Alathon 6210/E-VA/ABS 60/19/9/12 | 17 | 1 | strong, tough, dry surface |
| 7 | K-18/Alathon 6210/E-VA/ABS 60/18/8/14 | 17 | 1 | strong, tough, dry surface |
| 8 | K-18/Alathon 6210/E-VA/ABS 60/16/8/16 | 17 | 1 | strong, tough, dry surface |

As can be seen, the optimum composite is No. 8. That composite is moldable, non-oozing, and tough enough to withstand further processing. However, composites 4–7 are also acceptable for most purposes.

While certain representative embodiments and details have been shown for purposes of illustrating the invention, it will be apparent to those skilled in the art that various changes in the compositions and methods disclosed herein may be made without departing from the scope of the invention, which is defined in the appended claims.

What is claimed is:

1. A composite useful for thermal energy storage comprising a solidified melt mixture by weight percentage of about 15–22% of a polyolefin resin selected from the group consisting of uncrosslinked high density polyethylene and polypropylene, about 7–12% of an ethylene copolymer selected from the group consisting of an ethylene-vinyl acetate copolymer, an ethylene-methyl acrylate copolymer, and an ethylene-ethyl acrylate copolymer, about 7–16% silica particles having a surface area of from 50 to 500 square meters per gram and primary particle sizes of from 0.005 to 0.025 microns, and about 55–60% of a phase change material selected from the group consisting of crystalline alkyl hydrocarbons, crystalline fatty acids, crystalline fatty acid esters, crystalline 1-olefins, crystalline primary alcohols, crystalline alicyclic hydrocarbons, and crystalline aromatic hydrocarbons.

2. The composite of claim 1 wherein said ethylene copolymer is an ethylene-vinyl acetate copolymer containing approximately 10–20% by weight vinyl acetate.

3. The composite of claim 1 wherein said ethylene copolymer is ethylene-methyl acrylate or ethylene-ethyl acrylate containing 10–20% by weight acrylate.

4. The composite of claim 1 wherein said phase change material is a crystalline alkyl hydrocarbon having a heat of fusion of greater than about 30 cal/g.

5. The composite of claim 4 wherein said crystalline alkyl hydrocarbon phase change material is a paraffin having a C-18 or C-19 chain length and a melting and freezing point of about 75° F.

6. The composite of claim 5 wherein said composite is in pellet form.

7. The composite of claim 5 wherein said composite is in molded plug form sized to fit into the hollow core of a hollow core cementitious building block.

8. The composite of claim 4 wherein said crystalline alkyl hydrocarbon phase change material is a paraffin having a melting and freezing point of about 147° F.

9. The composite of claim 8 wherein said composite is molded and shaped to fit into the space between the walls of a dual walled food or beverage serving container.

10. The composite of claim 1 further including a microwave absorbing additive.

11. The composite of claim 10 wherein said microwave absorbing additive is selected from the group consisting of glycerine and carbon black.

12. The composite of claim 11 wherein said phase change material is a crystalline alkyl hydrocarbon having a heat of fusion of greater than about 30 cal/g, said polyolefin is a high density polyethylene, said ethylene copolymer is an ethylene-vinyl acetate containing by weight 10–20% vinyl acetate, said silica particles are precipitated silica particles having a surface area of from 50–500 square meters and primary particle sizes of from 0.005 to 0.025 microns, and said microwave absorbing additive is glycerine.

13. The composite of claim 12 wherein the weight percentage of each ingredient based on the total weight of said composite is about 55% phase change material, about 15–21% polyolefin, about 7–11% ethylene copolymer, about 7–15% silica particles, and about 7.5% microwave absorbing additive.

14. The composite of claim 1 wherein the weight percentage of each ingredient based on the total weight of said composite is about 60% of said phase change material, about 16–22% of said polyolefin, about 8–12% of said ethylene copolymer, and about 8–16% of said silica particles.

15. The composite of claim 14 wherein said phase change material is a crystalline alkyl hydrocarbon having a heat of fusion of greater than about 30 cal/g, said polyolefin is a high density polyethylene, said ethylene copolymer is an ethylene-vinyl acetate copolymer containing by weight 10–20% vinyl acetate, and said silica particles are precipitated silica particles having a surface area of from 50–500 square meters and primary particle sizes of from 0.005 to 0.025 microns.

16. The method of preparing a composite useful for thermal energy storage comprising:

melting an amount of a phase change material which comprises about 55–60 weight percentage of the composite, said phase change material being selected from the group consisting of crystalline alkyl hydrocarbons, crystalline fatty acids, crystalline fatty acid esters, crystalline 1-olefins, crystalline primary alcohols, crystalline alicyclic hydrocarbons, and crystalline aromatic hydrocarbons, stirring an amount of silica particles which comprises about 7–16 weight percentage of the composite into said melted phase change material until a stiff gel is formed, said silica particles having a surface area of from 50 to 500 square meters per gram and primary particle sizes of from 0.005 to 0.025 microns, adding to the stiff gel a mixture of an amount of polyolefin resin which comprises about 15–22 weight percentage of the composite and an amount of ethylene copolymer which comprises about 7–12 weight percentage of the composite, said polyolefin resin being selected from the group consisting of uncrosslinked high density polyethylene and polypropylene and said ethylene copolymer being selected from the group consisting of an ethylene-vinyl acetate copolymer, an ethylene-methyl acrylate copolymer, and an ethylene-ethyl acrylate copolymer, heating to melt said polyolefin resin and said ethylene copolymer, mixing vigorously to form a uniform viscous gel, cooling said viscous gel to solidify it into a moldable composite, and forming said moldable composite into a shape useful for thermal energy storage.

17. The method of claim 16 further including the step of adding a microwave absorbing additive prior to said cooling step.

18. The method of claim 16 wherein said forming step involves molding said moldable composite is molded and shaped to fit into the space between the walls of a dual walled beverage or food container.

19. The method of claim 16 wherein said forming step involves molding said moldable composite into the shape of a plug sized to fit into the hollow core of a hollow core cementitious building block.

20. The method of claim 17 where said phase change material is a crystalline alkyl hydrocarbon having a heat of fusion of greater than about 30 cal/g, said polyolefin is a high density polyethylene, said ethylene copolymer is an ethylene-vinyl acetate containing by weight 10–20% vinyl acetate, said silica particles are precipitated silica particles having a surface area of from 50–500 square meters and primary particle sizes of from 0.005 to 0.025 microns, and said microwave absorbing additive is glycerine.

* * * * *